Oct. 9, 1945. G. E. DATH 2,386,384

RAILWAY CAR TRUCK

Filed May 19, 1944

Inventor
George E. Dath
By Henry Fuchs
Atty.

Patented Oct. 9, 1945

2,386,384

UNITED STATES PATENT OFFICE 2,386,384

RAILWAY CAR TRUCK

George E. Dath, Mokena, Ill., assignor to W. H. Miner, Inc., Chicago, Ill., a corporation of Delaware Application May 19, 1944, Serial No. 536,325

3 Claims. (Cl. 105—197)

This invention relates to improvements in railway car trucks.

One object of the invention is to provide simple and efficient friction means for snubbing or dampening the action of the usual truck springs of a railway car, thereby reducing the oscillations and vibrations of the same to such an extent that the car and its lading are protected against damage.

Another object of the invention is to provide a snubbing means comprising rockable friction members movable with the truck bolster of a railway car truck and having sliding frictional engagement with the bolster guides of the truck side frame, wherein spring means is employed, mounted on the side frame for pressing the rocking friction members against the bolster guides, the spring means being arranged to also add to the load carrying capacity of the truck springs.

Other objects of the invention will more clearly appear from the description and claims hereinafter following.

Figure 1:
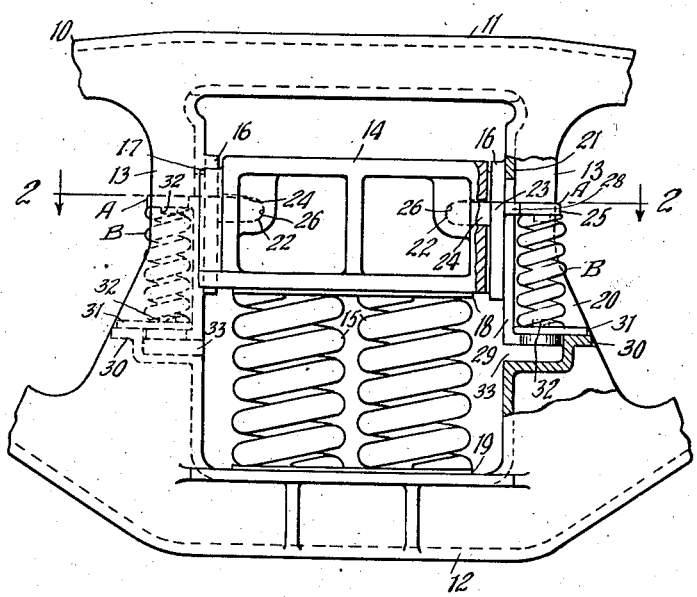
Figure 2:
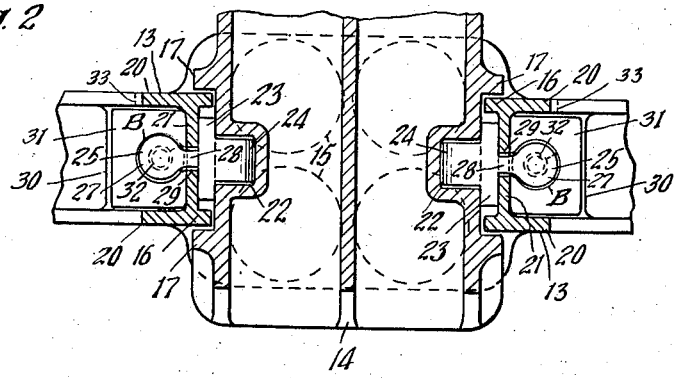
Figure 3:
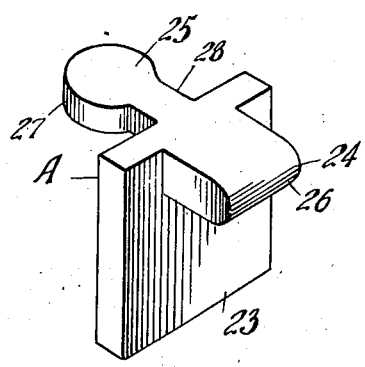

In the drawing forming a part of this specification, Figure 1 is a side elevational view of a portion of a railway car truck, illustrating my improvements in connection therewith, certain parts of the side frame and the truck bolster being shown in vertical section. Figure 2 is a horizontal sectional view, corresponding substantially to the line 2—2 of Figure 1. Figure 3 is a detailed, perspective view of one of the rocking friction members of my improved snubbing means.

In said drawing, 10 indicates one of the side frame members of a railway car truck. The side frame 10, as shown, is in the form of a casting and has top and bottom members 11 and 12 connected by spaced vertical sections 13—13 forming guides for the truck bolster. As will be understood by those skilled in this art, the truck includes two side frame members 10—10, a truck bolster 14, and truck springs 15—15. The bolster 14 has its opposite ends guided between the vertical sections 13—13 of the truck side frames 10—10 and is supported by the springs 15—15. As most clearly shown in Figure 1, the sections 13—13 are inwardly offset at their upper end portions to provide guides 16—16, which cooperate with guide seats 17—17 at the sides of the bolster 14. The truck springs 15—15 are supported directly on the bottom members 12—12 of the side frames 10—10, the usual top and bottom spring follower plates 18 and 19 being interposed between each truck spring cluster and the truck bolster and the bottom member of the side frame.

As illustrated in the drawing, my improved snubbing means includes broadly a pair of rocking friction members or shoes A—A at each end of the truck bolster, and a coil spring B cooperating with each rocking friction member.

In carrying out my invention, I provide each of the vertical sections 13—13 of the truck side frame with laterally spaced, vertically extending, parallel ribs 20—20, which project from the vertical inner wall 21 of the section 13 at opposite side edges of said wall, and together form the corresponding inwardly offset guide 16 which engages in the seat 17 at the corresponding side of the bolster 14. At opposite sides of the bolster 14, fulcrum pockets or seats 22—22 are provided for the rocking friction members A—A, the seats 22—22 being in transverse alignment and formed by inwardly offsetting the vertical side walls of the truck bolster. The seats 22—22 are located near the upper portion of the bolster 14 at the centers of the guide seats thereof.

The rocking friction members or shoes A are four in number for each truck of the railway car, the same being arranged in pairs at opposite ends of the truck bolster, the members of each pair being at opposite sides of said bolster. Each rocking friction member A comprises a flat rectangular plate member 23, a fulcrum arm 24 projecting from the inner side of the plate 23 at the upper end thereof, and a spring follower arm 25 projecting from the outer side of the plate at the upper end of the same. The arms 24 and 25 extend at right angles to the plate and the outer end of the arm 24 is rounded off, as indicated at 26. The arm 25 has a disclike follower plate portion 27 at the outer end thereof, which is connected to the plate 23 by a narrow shank 28.

As hereinbefore stated, the friction members A—A are disposed at opposite sides of the bolster. The plate 23 of each friction member A is interposed between the side of the bolster and the wall 21 of the corresponding vertical section 13 of the side frame. The arm 24 of the plate 23 is engaged in the corresponding fulcrum seat 22 of the bolster and has its rounded end 26 seated against the inner end wall of the seat 22, which wall is also rounded to properly cooperate with the end of the arm. The arm 25 of the plate 23 extends through the wall 21 of the section 13 of the truck side frame, said wall being vertically slotted, as indicated at 29, to accommodate the shank 28 of said arm for vertical sliding movement and slight rocking action.

The springs B are four in number for each truck, one spring B being associated with each rocking friction member A. The spring B of each rocking friction member is interposed between the follower disc portion 27 of the arm 25 of said member and a horizontally disposed web 30 on the corresponding side of the truck side frame connecting the side walls of said side frame. The spring B is under initial compression and tends to rock the shoe A outwardly away from the side of the bolster against the wall 21 of the side frame. A spring follower plate 31 is preferably interposed between the bottom end of the spring B and the web 30. The spring follower plate 31 and the disclike follower portion 27 of the arm 25 are provided with centering projections 32—32 which engage in the upper and lower ends of the spring B to hold the same properly centered.

In order to facilitate assembling of the rocking friction members with the side frames, the back wall of the side frame is horizontally slotted at the vertical sections 13 thereof, as indicated at 33—33. The fulcrum arms of the rocking friction members are first placed in the sockets or pockets of the bolster, and the bolster, with the rocking friction members assembled therewith, is then slit into position between the guides 16—16 and 16—16 of the truck side frame, the spring follower arms 25—25 of the rocking friction members passing through the slots 33—33 in the side frame walls.

The operation of my improved snubbing means is as follows: Upon relative vertical movement of the bolster 14 with respect to the side frame 10, the coils of the truck spring cluster are compressed between the bolster and the bottom member 12 of the truck side frame. At the same time the friction members A—A are forced to slide vertically along the bolster guides, moving substantially in unison with the bolster 14. This movement of the friction members is resisted by the springs B—B which also tend to rock the friction members to force the friction plate portions thereof tightly against the bolster guides. A friction snubbing action is thus produced during compression of the springs. As will be evident, the capacity of the springs B—B is added to the capacity of the usual truck springs, thereby substantially increasing the carrying capacity of the spring means. During recoil of the truck springs, the friction elements A—A move upwardly with the bolster and, due to the frictional engagement thereof with the guides on the truck side frame, also dampen the recoil action.

I have herein shown and described what I now consider the preferred manner of carrying out my invention, but the same is merely illustrative and I contemplate all changes and modifications that come within the scope of the claims appended hereto.

I claim:

1. In a railway car truck including a truck side frame having spaced bolster guides, the combination with a vertically movable bolster; of a cluster of truck springs supporting said bolster on the side frame; rocking friction members movable with the bolster, each of said friction members having a laterally extending fulcrum arm at one side thereof and a laterally extending spring abutment arm at the other side, said friction members being interposed between the bolster and the bolster guides and slidably engaging said guides, the fulcrum arm of each member being fulcrumed on the corresponding side of the bolster; and spring means buttressed against the side frame, said spring means engaging the spring abutment arms for pressing the friction members against the bolster guides.

2. In a railway car truck including a truck side frame having spaced bolster guides, the combination with a vertically movable bolster; of a cluster of truck springs supporting said bolster on the side frame; rocking friction members at opposite sides of the bolster, each friction member including a friction plate having laterally projecting arms at opposite sides thereof, said plate being interposed between one side of the bolster and the corresponding bolster guide and having one of its arms fulcrumed on the bolster and the other arm of said plate extending through the bolster guide; a spring abutment on the side frame below said last named arm; and a spring bearing at opposite ends on the spring abutment and said last named arm.

3. In a railway car truck including a truck side frame having spaced bolster guides, the combination with a vertically movable bolster having fulcrum pockets at opposite sides thereof; of a cluster of truck springs supporting said bolster on the side frame; rocking friction members at opposite sides of the bolster, each friction member comprising a plate interposed between the side of the bolster and the corresponding bolster guide; a fulcrum arm laterally projecting from the upper end of said plate at the inner side thereof, said arm being fulcrumed in the fulcrum pocket at the corresponding side of the bolster; a spring follower arm laterally projecting from the upper end of said plate at the outer side thereof, said arm extending through the corresponding bolster guide; a spring abutment on said side frame below said spring follower arm; and a spring interposed between said spring follower arm and spring abutment, said spring bearing at opposite ends on said abutment and the outer end of said spring follower arm.

GEORGE E. DATH.